(12) United States Patent
Ahlers et al.

(10) Patent No.: US 11,850,455 B2
(45) Date of Patent: Dec. 26, 2023

(54) FIRE PROTECTION ELEMENT

(71) Applicant: Hilti Aktiengesellschaft, Schaan (LI)

(72) Inventors: Andreas Ahlers, Westendorf (DE); Sebastian Simon, Buchloe Lindenberg (DE)

(73) Assignee: Hilti Aktiengesellschaft, Schaan (LI)

( * ) Notice: Subject to any disclaimer, the term of this patent is extended or adjusted under 35 U.S.C. 154(b) by 413 days.

(21) Appl. No.: 17/309,410

(22) PCT Filed: Nov. 22, 2019

(86) PCT No.: PCT/EP2019/082292
§ 371 (c)(1),
(2) Date: May 26, 2021

(87) PCT Pub. No.: WO2020/120108
PCT Pub. Date: Jun. 18, 2020

(65) Prior Publication Data
US 2022/0032098 A1    Feb. 3, 2022

(30) Foreign Application Priority Data
Dec. 10, 2018  (EP) .................... 18211203

(51) Int. Cl.
A62C 2/06     (2006.01)
A62C 2/24     (2006.01)
F16L 5/04     (2006.01)

(52) U.S. Cl.
CPC .............. *A62C 2/065* (2013.01); *A62C 2/241* (2013.01); *A62C 2/248* (2013.01); *F16L 5/04* (2013.01)

(58) Field of Classification Search
CPC ......... A62C 2/065; A62C 2/241; A62C 2/248; A62C 2/242; A62C 3/16; F16L 5/04
See application file for complete search history.

(56) References Cited

U.S. PATENT DOCUMENTS

| | | | |
|---|---|---|---|
| 7,784,234 B2 * | 8/2010 | Warmolts | F16L 5/025 52/220.8 |
| 2007/0193141 A1 | 8/2007 | Warmolts et al. | |
| 2013/0031856 A1 * | 2/2013 | Pilz | E04B 1/941 52/232 |

FOREIGN PATENT DOCUMENTS

| | | | |
|---|---|---|---|
| DE | 202 14 256 U1 | 11/2002 | |
| GB | 2 077 382 | 12/1981 | |
| WO | WO-2019057855 A1 * | 3/2019 | ............ F16L 41/086 |

OTHER PUBLICATIONS

International Search Report dated Jan. 8, 2020 in PCT/EP2019/082292 with English translation, 6 pages.
Written Opinion dated Jan. 8, 2020 in PCT/EP2019/082292 with English translation, 9 pages.

* cited by examiner

*Primary Examiner* — Patrick J Maestri
(74) *Attorney, Agent, or Firm* — Grüneberg and Myers PLLC

(57) ABSTRACT

A fire protection element for sealing a combustible body which penetrates an opening in a wall or ceiling, in the event of a fire, contains a fire protection insert and a heat-activatable drive for the fire protection insert, wherein the fire protection insert is in an initial position within the wall or ceiling and, in the event of a fire, is moved into a use position in which the fire protection insert is at least partially outside the wall or ceiling.

20 Claims, 3 Drawing Sheets

FIRE PROTECTION ELEMENT

CROSS-REFERENCE TO RELATED APPLICATIONS

This application is a National Stage entry under § 371 of International Application No. PCT/EP2019/082292, filed on Nov. 22, 2019, and which claims the benefit of European Application No. 182112037, filed on Dec. 10, 2018. The content of each of these applications is hereby incorporated by reference in its entirety.

BACKGROUND OF THE INVENTION

Field of the Invention

The invention relates to a fire protection element for sealing a combustible body which penetrates an opening in a wall or ceiling in the event of a fire, and a fire protection device.

Description of Related Art

In order to prevent the spread of fire or smoke in buildings, openings in ceilings or walls in which, for example, pipes or cables are guided must be able to be closed in the event of a fire. For this purpose, various fire protection solutions are used, for example bandages or wraps that are mounted in the wall or as sleeves in front of the wall.

In this case, various fire protection means are used, for example in the form of inserts, which are, for example, attached to a housing. Intumescent materials in particular are suitable for the inserts. In the event of a fire, the intumescent material foams up under the effect of heat and closes the opening, as a result of which the spread of smoke or fire is prevented or at least delayed.

Fire protection sleeves have the advantage that they can be mounted outside the wall and therefore can be heated more rapidly in the event of a fire, as the fire protection means is not passively cooled by the surrounding wall.

However, since the sleeves have to be mounted on the outer face of the wall, the fire protection can only be installed after the wall or ceiling, for example made of concrete, has already been cast, and pipes or cable guides have been laid. As a result, additional steps are necessary. At the same time, there is no fire protection until the sleeves are mounted.

A fire protection wrap is known from WO 2016 202 681 A1, which comprises an intumescent material on a carrier. The carrier is made of a material which automatically coils up into a spiral when no opposing force acts on the material. The fire protection wrap is, for example, clamped around a pipe in a wall and is thus kept under pretension. In the event of a fire, the pipe melts away, causing the fire protection wrap to uncoil and thereby introduce the intumescent material into the interior of the opening within the wall.

WO 2004 015 319 A1 discloses a sleeve in which a tensioned helical spring and a heat-resistant woven fabric are provided in an annular housing. In the event of a fire, the helical spring compresses the melting pipe, and thereby pulls the heat-resistant woven fabric into the interior of the tube opening. In addition, an intumescent material is provided which is arranged around the pipe, between a wall and the helical spring and ensures an additional closure of the opening.

In DE 10 2004 014 347 B4, lamellar locking elements made of bimetal are used, which are coiled around the pipe and uncoil in the event of a fire in order to thereby close the opening in an iris-like manner.

Pipe feedthroughs are known from US 2017 009 470 A1 that can be flexibly adapted to the thickness of a wall or ceiling, and can already be mounted during the casting of the wall or ceiling. However, said pipe feedthroughs have no fire protection function.

SUMMARY OF THE INVENTION

The object of the invention is to provide a fire protection solution which can already be mounted during the production of a wall or ceiling, and can be activated early in the event of a fire.

The object is achieved according to the invention by means of a fire protection element for sealing a combustible body, which penetrates an opening in a wall or ceiling, in the event of a fire, which element comprises a fire protection insert and a heat-activatable drive means for the fire protection insert, the fire protection insert being in an initial position within the wall or ceiling and, in the event of a fire, being moved by the heat-activatable drive means into a use position in which the fire protection insert is at least partially outside the wall or ceiling.

DETAILED DESCRIPTION OF THE INVENTION

Figure 1:
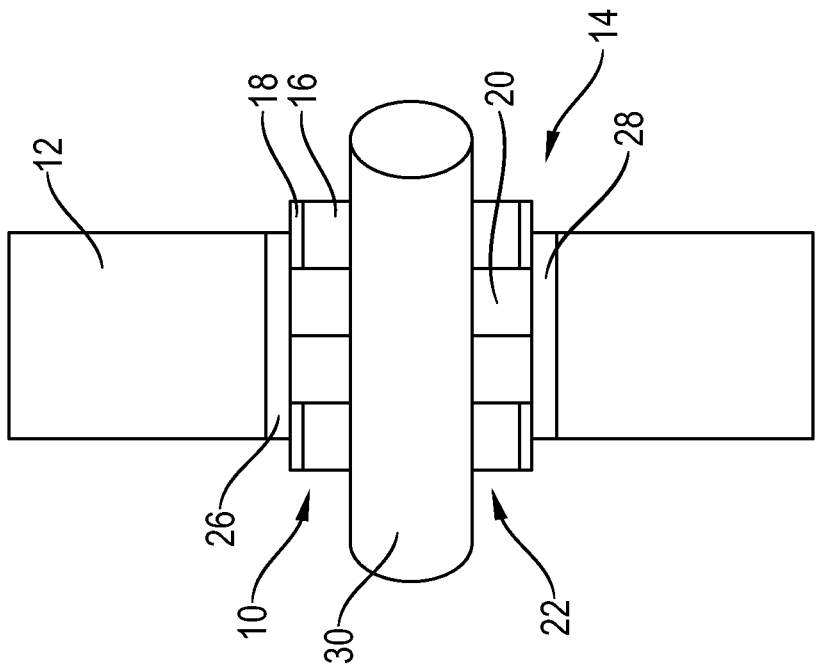
FIG. 1 shows a schematic view of a fire protection element according to the invention in the initial position of the fire protection insert.

In this way, the fire protection element can first be mounted within the wall or ceiling, for example as a cast-in during the casting of the wall or ceiling using concrete, and, at the same time, the fire protection insert of the fire protection element can be moved in front of the wall in the event of a fire. The fire protection material of the fire protection insert is therefore not covered and/or cooled by a surrounding wall or ceiling, as a result of which an early activation and thus a reliable closure of the opening in the event of a fire is made possible.

At the same time, the fire protection element does not have to be mounted as a sleeve in front of the wall from the outset, as a result of which the fire protection element can also be mounted in confined spaces and is not visible from the outside.

In addition, various fire protection materials are suitable for the fire protection insert, such that the fire protection element can be used for a variety of applications, for example for conduits or cable feedthroughs.

The heat-activatable drive means can comprise a spring, a bimetal and/or an expandable gas as the drive element.

Springs are a particularly cost-effective drive element, while a bimetal and an expandable gas can be used for a constant action of force.

In a preferred embodiment, the heat-activatable drive means comprises a housing and a retaining element connected to the housing, and at least one spring arranged in the housing, the retaining element holding the spring under pretension when in the initial position and releasing the spring under the effect of heat. In the event of a fire, a large force is immediately applied to the fire protection insert by the pretensioned spring as soon as the retaining element yields. This reliably makes it possible to move the fire protection insert out of the wall or ceiling into the use position within a very short time.

The housing can also consist of a plurality of housing parts, a first housing part being connected to the retaining element and a second housing part being arranged around the fire protection element, for example as a cladding pipe. An arrangement of this kind prevents the penetration of concrete into the fire protection element, if said element is already mounted, for example on a formwork, before the wall or ceiling is cast. In addition, an embodiment of this kind prevents the penetration of moisture or dirt after completion of the wall or ceiling.

The retaining element can at least partially consist of a material having a low melting point, preferably of a plastics material having a low melting point or of soft solder, for example soldering tin. In this way it can be ensured that, at a temperature which is predetermined by the softening point of the retaining element, the fire protection insert transitions to the use position early, and an early activation is thus ensured.

The heat-activatable drive means preferably comprises a carrier on which the fire protection insert is mounted. A stable connection between the fire protection insert and the heat-activatable drive means can be ensured by means of the carrier. At the same time, the drive element does not have to act directly on the fire protection insert, but can also move the fire protection insert by moving the carrier. As a result, the fire protection insert can be made thinner, since the insert itself does not have to have any surface in contact with the drive element. At the same time, the carrier can be designed, for example using recesses, such that a good power transmission and a stable connection to the drive element is ensured.

The fire protection insert can comprise a fire protection material selected from the group consisting of intumescent materials, in particular expandable graphite, fire protection coatings, fire protection foams, in particular based on polyurethane, and ablation coatings, in particular aluminum trihydrate, and combinations thereof. The most suitable fire protection material for a particular requirement can be selected accordingly. The fire protection element can therefore be used for a plurality of applications. It is also conceivable that the fire protection element is assembled and provided with the desired fire protection insert only once said element is on site. Thus, although different fire protection inserts are still necessary, only one mechanism is needed.

In order to prevent the spread of smoke in the event of a fire, the fire protection element can additionally comprise a smoke protection seal, preferably made of rubber or an elastomer. In this case, the smoke protection seal is advantageously mounted on an end of the fire protection element that is opposite the fire protection insert, for example in a recess of the housing, in order to form a second barrier against smoke behind the actual fire protection material.

In a preferred embodiment, the fire protection insert and the heat-activatable drive means are each constructed from a plurality of parts, preferably from two to four parts, such that the parts of the fire protection insert can be moved independently of one another from the initial position into the use position. In this way the fire protection insert is prevented from being blocked, for example by irregularities or remains of the combustible body, and not extending from the wall or ceiling in the event of a fire. If the fire protection insert consists of a plurality of parts, it is ensured that at least one of the parts lies in front of the wall in the event of a fire, thus ensuring at least an early, at least partial closure of the opening. The parts blocked in the wall can subsequently, when triggered later, ensure a complete closure within the wall or ceiling.

The individual parts in this embodiment can also be correspondingly held in the initial position thereof by a plurality of retaining elements having a low melting point. As a result, it is possible for some of the retaining elements to melt earlier than others, and for at least part of the fire protection insert to already be moved in front of the wall or ceiling and therefore be activated earlier.

It is particularly advantageous if the fire protection element is flush with the wall or ceiling in the initial position of the fire protection insert. In this way, the fire protection element can be mounted directly, for example as a cast-in on a formwork before the wall or ceiling is cast. At the same time usable fire protection is already installed from the point in time at which the wall or ceiling is cast. Also, except for in the event of a fire, the fire protection element does not require any space in front of the wall, making it possible to use said element even in confined spaces.

Furthermore, the object is achieved according to the invention by means of a fire protection device, comprising two fire protection elements of the type described above, characterized in that the two fire protection elements are arranged symmetrically with respect to the center of the opening of the wall or ceiling. A fire protection device of this kind has the advantage that it can be assembled from two identical fire protection elements, such that only one fire protection element is necessary for different applications. At the same time, it is ensured that the fire protection inserts of the two fire protection elements can each be moved on a face of the wall or ceiling in front of said elements.

Figure 2:
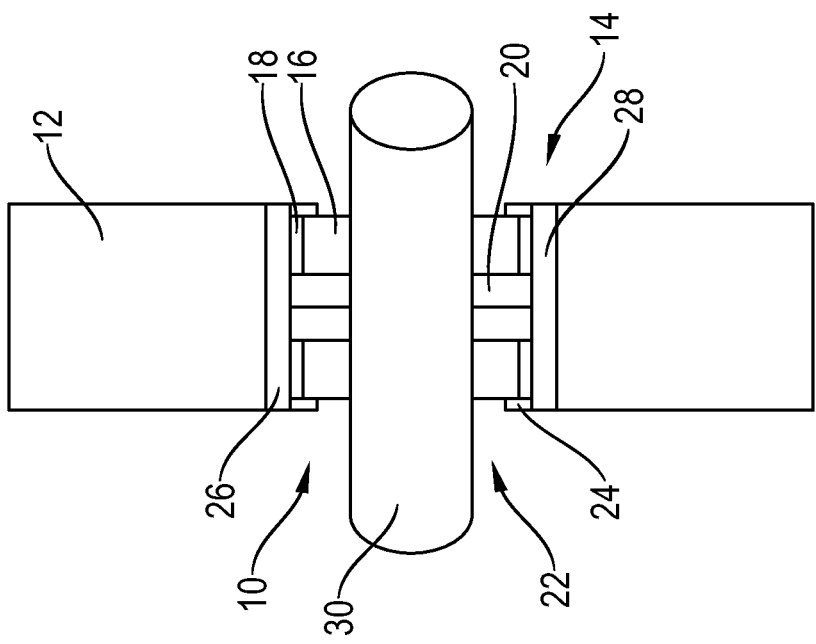
FIG. 2 shows the fire protection element from FIG. 1 in the use position of the fire protection insert.
Figure 4:
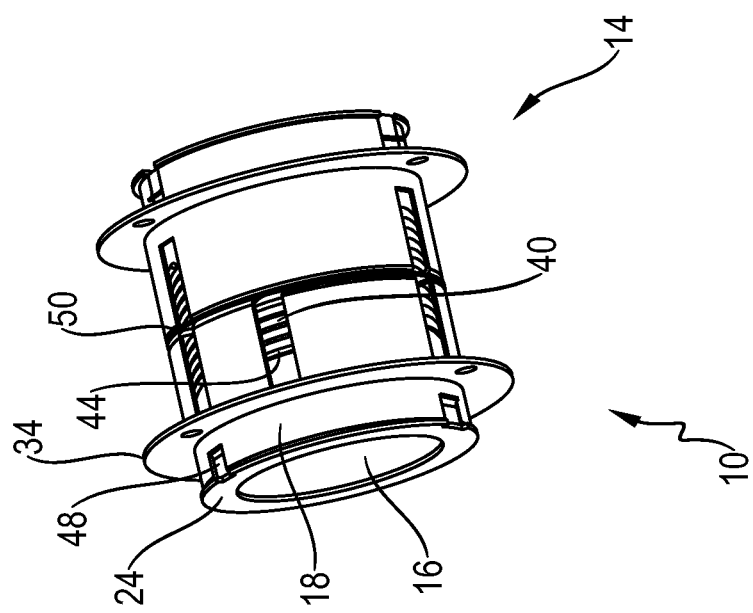
FIG. 4 shows a perspective view of a fire protection element according to FIG. 3.
Figure 3:
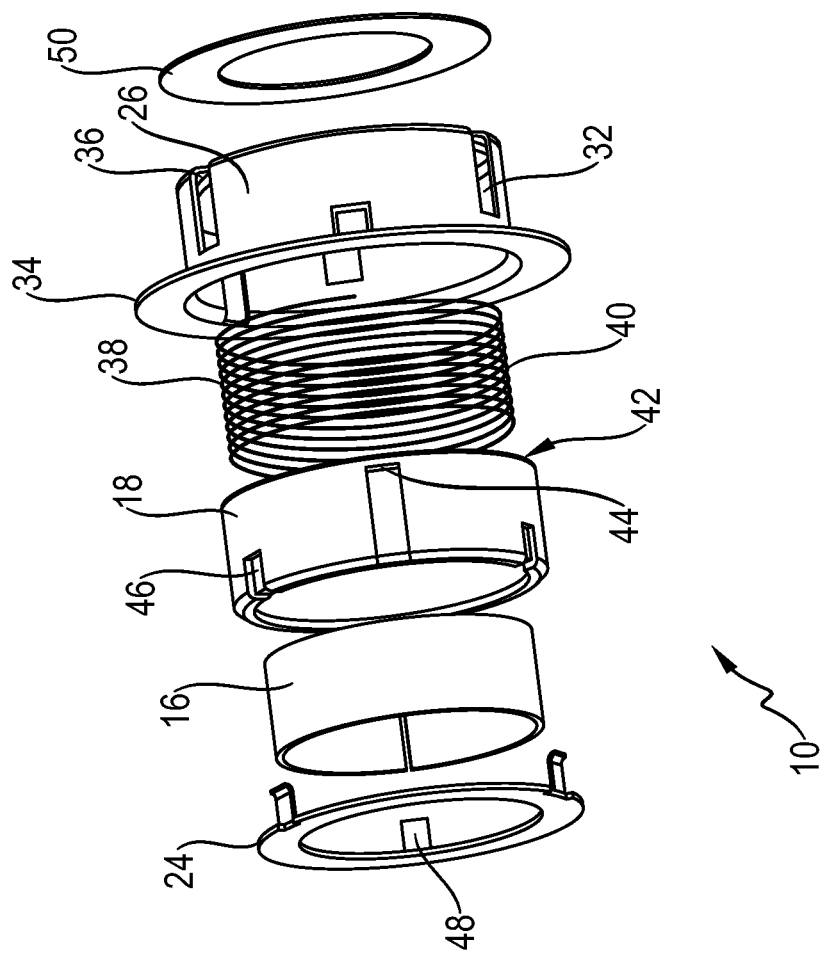
FIG. 3 shows an exploded view of a first embodiment of the fire protection element.
Figure 6:
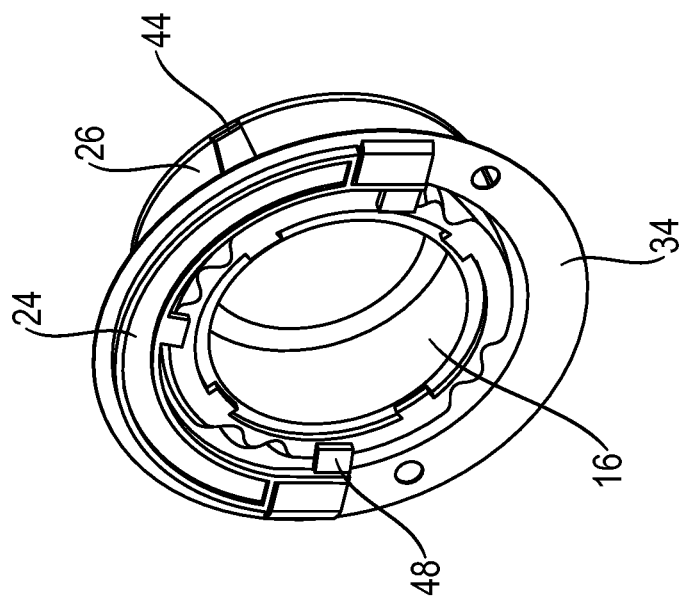
FIG. 6 shows a perspective view of a fire protection element according to FIG. 5.
Figure 5:
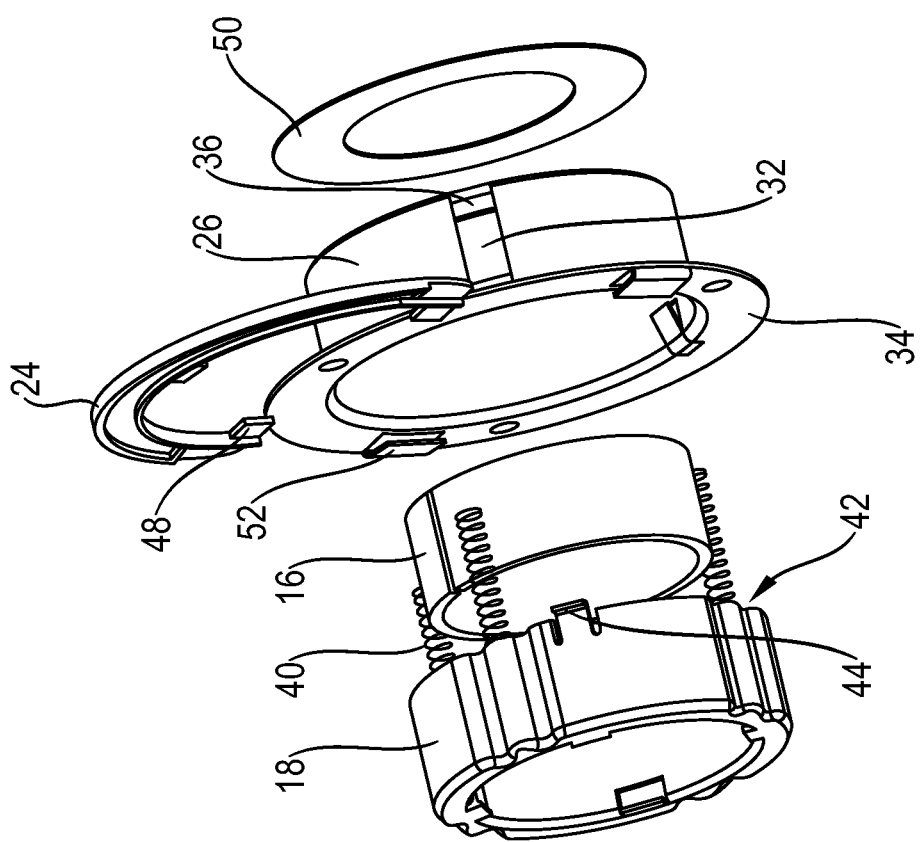
FIG. 5 shows an exploded view of a second embodiment of the fire protection element.

Further advantages and properties of the invention can be found in the following description of preferred embodiments, and the drawings to which reference is made. These should not be understood in a restrictive sense. In the drawings:

FIG. 1 is a schematic view of a fire protection element according to the invention in the initial position of the fire protection insert, FIG. 2 shows the fire protection element from FIG. 1 in the use position of the fire protection insert, FIG. 3 is an exploded view of a first embodiment of the fire protection element, FIG. 4 is a perspective view of a fire protection element according to FIG. 3, FIG. 5 is an exploded view of a second embodiment of the fire protection element, and FIG. 6 is a perspective view of a fire protection element according to FIG. 5.

FIG. 1 is a schematic view of a fire protection element 10 according to the invention within a wall 12. In the shown embodiment, a fire protection element 10 is mounted on each side of the wall 12, such that said elements form a fire protection device 14.

The fire protection element 10 comprises a fire protection insert 16 and a carrier 18, to which the fire protection insert 16 is connected, and a heat-activatable drive means 20 for the fire protection insert 16. In the shown embodiment, the fire protection insert 16 and the carrier 18 are arranged closer to the ends of the opening 22 that face out from the wall 12, than to the heat-activatable drive means 20.

The fire protection insert 16 is held within the wall 12 by means of retaining elements 24 having a low melting point. A housing 26 surrounds the fire protection insert 16 and the heat-activatable drive means 20. In the shown embodiment, the housing 26 is shown as a continuous cladding pipe 28 that surrounds the two fire protection elements 10. In principle, however, one housing 26 could also be provided per fire protection element 10, which lie flush against one another. Within the fire protection element 10, a pipe 30 is guided through the opening 22 in the wall 12.

The same arrangement is shown in FIG. 2 as in FIG. 1, but in the use position of the fire protection element 10. The retaining elements 24 have been melted away, as a result of which the heat-activatable drive means 20 has moved the fire protection insert 16, together with the carrier 18, partially in front of the wall 12.

FIG. 3 is an exploded view of an embodiment of a fire protection element 10 according to the invention. A cylindrical housing 26 which is open at both ends has a plurality of recesses 32 on the lateral surface thereof, a circumferential collar 34 at one axial end and a circumferential groove 36 at the other axial end. The collar 34 projects radially outward, beyond the inner diameter of the housing 26, such that the housing 26 can be fastened, for example on the outer face of the wall 12 or on a formwork for casting the wall 12, by means of the collar 34. The circumferential groove 36 extends within a shoulder of the housing 26 that projects radially inward.

The drive element 38 of the heat-activatable drive means 20 is a spring 40 which is arranged having the one axial end thereof within the groove 36 of the housing 26. The spring 40 is mounted on the carrier 18 at the axial end thereof that is opposite the groove 36. On one side, the carrier 18 can have an annular groove 42 in which the spring 40 is received.

The carrier 18 has at least one projection 44 on the outer face thereof that can engage in the recesses 32 of the housing 26, and thus prevents the carrier 18 from being able to be pushed beyond the use position of the fire protection insert 16 and completely out of the housing 26 by the spring 40.

At the end of the carrier 18 that is opposite the spring 40, said carrier has three retaining recesses 46 which are distributed over the circumference of the carrier 18. A single retaining recess 46 would also be sufficient, but a more stable assembly of the fire protection element 10 is achieved using a plurality of retaining recesses 46.

An annular fire protection insert 16 can be used within the carrier 18. The fire protection insert 16 can consist of different fire protection materials, particularly preferably of an intumescent material, such as expandable graphite, which increases the volume thereof in the event of a fire and thereby closes the opening 22.

An annular retaining element 24 having a plurality of axially projecting tongues 48 is mounted on the carrier 18. The tongues 48 are in this case received within the retaining recesses 46 of the carrier 18 and have radially outwardly projecting lugs. The lugs each engage in a recess 32 of the housing 26 and thus hold the carrier 18 in the housing 26, while the spring 40 which is compressed by the carrier 18 is under pretension. The projection 44 of the carrier 18 can be guided in the same recess 32 as the lugs of the tongues 48 or, as seen in FIG. 4, in a separate recess 32. The annular retaining element 24 can be fixed on the carrier 18, for example by means of adhesion.

The tongues 48, at least, consist of a material having a low melting point, for example an alloy having a low melting point, such as a soft solder or a plastics material, and therefore melt away early in the event of a fire, due to the heat input. In principle, however, the entire retaining element 24 can also be made of a material having a low melting point.

In addition, the fire protection element 10 comprises a smoke protection seal 50, which is arranged on the side of the housing 26 that is opposite the retaining element 24, and prevents the spread of smoke over the sides of the fire protection element 10 in the event of a fire.

FIG. 4 is a perspective view of a fire protection device 14 comprising two fire protection elements 10 and 10' according to FIG. 3. The two fire protection elements 10 and 10' are arranged substantially symmetrically with respect to the center of the fire protection device 14, both housings 26 and 26' being mounted rotationally offset from one another. The smoke protection seal 50 is mounted between the two fire protection elements 10 and 10', such that only one smoke protection seal 50 is needed for both fire protection elements 10 and 10'.

The projection 44 of the carrier 18 is guided within the recess 32 of the housing 26. As a result, in the event of a fire an uncontrolled extension of the carrier 18 out of the opening 22 is prevented, since the projections 44 can, at most, be moved as far as the collar 34 of the housing 26.

The tongues 48 of the retaining element 24 lie within the retaining recesses 46. If the carrier 18 is then moved to the center of the fire protection device 14, the spring 40 is compressed. The lugs of the tongues 48 in this case engage in the recesses 32 of the housing 26. As a result, the spring 40 is pretensioned and the fire protection insert 16 is held within the fire protection element 10 in the initial position thereof.

Since the tongues 48 consist of a material having a low melting point, for example a plastics material having a low melting point, or a soft solder, the lugs of the tongues 48, at least, melt away in the event of a fire. As a result, the tension is released from the spring 40 and said spring pushes the carrier 18 from the housing 26, out of the wall 12. The fire protection insert 16 is thus moved into the use position thereof in front of the wall, and can then be activated under the effect of heat.

FIGS. 5 and 6 show an alternative embodiment of the fire protection element 10. In this embodiment, four springs 40 are used as a drive element 38, which springs each engage in annular grooves 42 of the carrier 18. At the other end thereof, the springs 40 are supported within the circumferential groove 36 of the housing 26.

In this embodiment, the housing 26 has a plurality of tabs 52 on the collar 34. The retaining element 24 is designed as an arc, the ends of which engage in the tabs 52 on the collar 34 of the housing 26. The tongues 48, starting from the retaining element 24, point radially inward and thus hold the carrier 18 within the housing 26. The springs 40 are pretensioned by the carrier 18 inserted into the housing 26.

In the event of a fire, the tongues 48 melt away, as a result of which the carrier 18, together with the fire protection insert 16 received by the carrier 18, is pressed out of the wall 12 by the springs 40, and the fire protection insert 16 is moved into the use position thereof.

Since, in this embodiment, there is a plurality of independent drive elements 38 in the form of the springs 40, the carrier 18 and the fire protection insert 16 can be divided into a plurality of parts, for example halves, which can be moved out of the wall 12 independently of one another.

The fire protection elements 10 shown in FIGS. 3 to 6 can, in addition to the housing 26 shown, also have an additional cladding pipe 28, which is arranged around the housing 26. As a result, the penetration of concrete when casting the wall 12, and the penetration of dirt and moisture are prevented.

In an alternative embodiment, a bimetal (not shown) can be used as a drive element 38, instead of the springs 40. In this case, the bimetal can be present, for example, as a wrap which bends under the effect of heat and thereby exerts a force on the carrier 18 and moves said carrier, together with the fire protection insert 16, out of the wall 12.

In a further alternative embodiment, a gas can be enclosed within an annular chamber, which gas expands under the effect of heat and thereby pushes the carrier 18, together with the fire protection insert 16, outward.

The invention claimed is:

1. A fire protection element for sealing a combustible body which penetrates an opening in a wall or ceiling, in the event of a fire, the fire protection element comprising:
   a fire protection insert, and
   a heat-activatable drive for the fire protection insert,
   wherein the fire protection insert is in an initial position within the wall or ceiling and, in the event of a fire, is moved by the heat-activatable drive into a use position in which the fire protection insert is at least partially outside the wall or ceiling; and
   wherein the heat-activatable drive comprises a spring, a bimetal and/or an expandable gas as the drive element.

2. The fire protection element according to claim 1, wherein the heat-activatable drive comprises a housing and a retaining element connected to the housing, and at least one spring arranged in the housing, the retaining element holding the spring under pretension when in the initial position.

3. The fire protection element according to claim 2, wherein the retaining element comprises at least partially a material having a low melting point, or a soft solder.

4. The fire protection element according to claim 2, wherein the heat-activatable drive comprises a carrier on which the fire protection insert is mounted.

5. The fire protection element according to claim 4, wherein the retaining element has axially or radially projecting tongues which hold the carrier in the starting position in the housing.

6. The fire protection element according to claim 5, wherein the housing has one or more recesses or tabs, in which the tongues engage.

7. The fire protection element according to claim 4, wherein the carrier interacts with at least one spring arranged in the housing and holds the spring under pretension when in the initial position.

8. The fire protection element according to claim 4, wherein at least one projection is provided on the carrier, and wherein the housing has at least one recess, in which the projection is guided, the projection holding the carrier in the housing when the fire protection insert is moved into the use position.

9. The fire protection element according to claim 1, wherein the fire protection insert has a fire protection material selected from the group consisting of intumescent materials, fire protection coatings, fire protection foams, and ablative coatings.

10. The fire protection element according to claim 1, further comprising a smoke protection seal.

11. The fire protection element according to claim 1, wherein the fire protection insert and the heat-activatable drive are each constructed from a plurality of parts, such that the parts of the fire protection insert can be moved independently of one another from the initial position into the use position.

12. The fire protection element according to claim 1, which is flush with the wall or ceiling in the initial position of the fire protection insert.

13. A fire protection device, comprising:
   two fire protection elements according to claim 1,
   wherein the two fire protection elements are arranged symmetrically with respect to the center of the opening of the wall or ceiling.

14. A fire protection element for sealing a combustible body which penetrates an opening in a wall or ceiling, in the event of a fire, the fire protection element comprising:
   a fire protection insert, and
   a heat-activatable drive for the fire protection insert,
   wherein the fire protection insert is in an initial position within the wall or ceiling and, in the event of a fire, is moved by the heat-activatable drive into a use position in which the fire protection insert is at least partially outside the wall or ceiling; and
   wherein the heat-activatable drive comprises a housing and a retaining element connected to the housing, and at least one spring arranged in the housing, the retaining element holding the spring under pretension when in the initial position.

15. A fire protection device, comprising:
   two fire protection elements according to claim 14,
   wherein the two fire protection elements are arranged symmetrically with respect to the center of the opening of the wall or ceiling.

16. The fire protection element according to claim 14, wherein the retaining element comprises at least partially a material having a low melting point, or a soft solder.

17. The fire protection element according to claim 14, wherein the heat-activatable drive comprises a carrier on which the fire protection insert is mounted.

18. The fire protection element according to claim 17, wherein the retaining element has axially or radially projecting tongues which hold the carrier in the starting position in the housing.

19. The fire protection element according to claim 14, wherein the housing has one or more recesses or tabs, in which the tongues engage.

20. The fire protection element according to claim 17, wherein the carrier interacts with the at least one spring arranged in the housing and holds the spring under pretension when in the initial position.

* * * * *